(12) United States Patent
Chatterjee et al.

(10) Patent No.: US 11,170,397 B2
(45) Date of Patent: Nov. 9, 2021

(54) DYNAMIC REWARDS PROGRAM

(71) Applicant: AMERICAN EXPRESS TRAVEL RELATED SERVICES COMPANY, INC., New York, NY (US)

(72) Inventors: Priyabroto Chatterjee, New York, NY (US); Jaimie Daniels, New York, NY (US); Debasish Das, Jersey City, NJ (US); Kathleen King Goulart, Mattapoiseh, MA (US); Zhenling Huang, Jersey City, NJ (US); Marissa Eddings Lott, New York, NY (US); Anthony Mavromatis, New York, NY (US); Cristina Minervini, Paramus, NJ (US); Olutokunbo Ojo-Ade, Bowie, MD (US); Sepehr Sarmadi, New York, NY (US); Venkat Varadachary, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 54 days.

(21) Appl. No.: 16/706,066

(22) Filed: Dec. 6, 2019

(65) Prior Publication Data
US 2020/0193470 A1   Jun. 18, 2020

Related U.S. Application Data

(63) Continuation of application No. 13/686,608, filed on Nov. 27, 2012, now Pat. No. 10,504,132.

(51) Int. Cl.
*G06Q 30/02* (2012.01)

(52) U.S. Cl.
CPC .................. *G06Q 30/0226* (2013.01)

(58) Field of Classification Search
None
See application file for complete search history.

(56) References Cited

U.S. PATENT DOCUMENTS

| | | |
|---|---|---|
| 4,833,308 A | 5/1989 | Humble |
| 4,882,675 A | 11/1989 | Nichtberger et al. |
| 5,467,269 A | 11/1995 | Flaten |
| 5,471,669 A | 11/1995 | Lidman |
| 5,729,693 A | 3/1998 | Holda-Fleck |
| 5,918,211 A | 6/1999 | Sloane |
| 5,923,016 A | 7/1999 | Fredregill et al. |
| 5,948,040 A | 9/1999 | Delorme et al. |

(Continued)

OTHER PUBLICATIONS

Managing Databases with Binary Large Objects, Shapiro et al., 105 1-9 173199 1999 IEEE.*

(Continued)

*Primary Examiner* — David J Stoltenberg
(74) *Attorney, Agent, or Firm* — Thomas I Horstemeyer, LLP

(57) ABSTRACT

The systems are generally configured to provide rewards. The systems are capable of syncing transaction accounts with one or more reward programs and one or more channels. Moreover, the systems are capable dynamically provisioning rewards in one or more subsets to a rewards program to distribute high, medium and low value rewards to a reward program throughout the duration of the program.

20 Claims, 5 Drawing Sheets

(56) References Cited

U.S. PATENT DOCUMENTS

| | | |
|---|---|---|
| 5,953,706 A | 9/1999 | Patel |
| 6,009,411 A | 12/1999 | Kepecs |
| 6,018,718 A | 1/2000 | Walker et al. |
| 6,035,280 A | 3/2000 | Christensen |
| 6,039,244 A | 3/2000 | Finsterwald |
| 6,222,914 B1 | 4/2001 | Mcmullin |
| 6,266,649 B1 | 7/2001 | Linden et al. |
| 6,298,330 B1 | 10/2001 | Gardenswartz et al. |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,343,317 B1 | 1/2002 | Glorikian |
| 6,360,167 B1 | 3/2002 | Millington et al. |
| 6,370,514 B1 | 4/2002 | Messner |
| 6,381,603 B1 | 4/2002 | Chan et al. |
| 6,414,635 B1 | 7/2002 | Stewart et al. |
| 6,430,539 B1 | 8/2002 | Lazarus et al. |
| 6,434,534 B1 | 8/2002 | Walker et al. |
| 6,542,814 B2 | 4/2003 | Polidi et al. |
| 6,584,448 B1 | 6/2003 | Laor |
| 6,587,835 B1 | 7/2003 | Treyz et al. |
| 6,606,619 B2 | 8/2003 | Ortega et al. |
| 6,691,915 B1 | 2/2004 | Thaxton et al. |
| 6,738,711 B2 | 5/2004 | Ohmura et al. |
| 6,748,365 B1 | 6/2004 | Quinlan et al. |
| 6,847,935 B1 | 1/2005 | Solomon et al. |
| 6,865,544 B1 | 3/2005 | Austin |
| 6,882,290 B2 | 4/2005 | French et al. |
| 6,883,708 B1 | 4/2005 | Fiedler et al. |
| 6,904,408 B1 | 6/2005 | Mccarthy et al. |
| 6,915,265 B1 | 7/2005 | Johnson |
| 6,937,995 B1 | 8/2005 | Kepecs |
| 7,003,476 B1 | 2/2006 | Samra et al. |
| 7,010,497 B1 | 3/2006 | Nyhan et al. |
| 7,016,856 B1 | 3/2006 | Wiggins |
| 7,016,860 B2 | 3/2006 | Modani et al. |
| 7,054,830 B1 | 5/2006 | Eggleston et al. |
| 7,072,851 B1 | 7/2006 | Wilcox et al. |
| 7,107,238 B2 | 9/2006 | Hatakama et al. |
| 7,120,591 B1 | 10/2006 | Solomon et al. |
| 7,139,793 B2 | 11/2006 | Lala et al. |
| 7,146,328 B1 | 12/2006 | Solomon et al. |
| 7,165,037 B2 | 1/2007 | Lazarus et al. |
| 7,302,429 B1 | 11/2007 | Wanker |
| 7,392,224 B1 | 6/2008 | Bauer et al. |
| 7,406,436 B1 | 7/2008 | Reisman |
| 7,428,505 B1 | 9/2008 | Levy et al. |
| 7,430,521 B2 | 9/2008 | Walker et al. |
| 7,455,226 B1 | 11/2008 | Hammond et al. |
| 7,472,073 B1 | 12/2008 | Masi |
| 7,493,268 B2 | 2/2009 | Kepros et al. |
| 7,496,520 B1 | 2/2009 | Handel et al. |
| 7,499,889 B2 | 3/2009 | Golan et al. |
| 7,506,805 B1 | 3/2009 | Chakravarthy |
| 7,512,551 B2 | 3/2009 | Postrel |
| 7,596,566 B1 | 9/2009 | Patwardhan |
| 7,599,858 B1 | 10/2009 | Grady et al. |
| 7,618,318 B2 | 11/2009 | Ciancio et al. |
| 7,630,935 B2 | 12/2009 | Loeger et al. |
| 7,636,689 B2 | 12/2009 | Dent et al. |
| 7,647,278 B1 | 1/2010 | Foth et al. |
| 7,653,572 B1 | 1/2010 | Thompson |
| 7,660,743 B1 | 2/2010 | Messa et al. |
| 7,665,660 B2 | 2/2010 | Degliantoni et al. |
| 7,668,749 B2 | 2/2010 | Kepros et al. |
| 7,676,467 B1 | 3/2010 | Kozyrczak et al. |
| 7,681,786 B1 | 3/2010 | Chakravarthy |
| 7,702,540 B1 | 4/2010 | Woolston |
| 7,706,808 B1 | 4/2010 | Aggarwal et al. |
| 7,711,586 B2 | 5/2010 | Aggarwal et al. |
| 7,734,486 B2 | 6/2010 | Mortimore, Jr. |
| 7,739,134 B2 | 6/2010 | Mortimore, Jr. |
| 7,742,954 B1 | 6/2010 | Handel et al. |
| 7,743,002 B2 | 6/2010 | Hernandez |
| 7,747,524 B2 | 6/2010 | Brown |
| 7,751,805 B2 | 7/2010 | Neven et al. |
| 7,752,328 B2 | 7/2010 | Mortimore, Jr. et al. |
| 7,765,119 B2 | 7/2010 | Messa |
| 7,788,141 B1 | 8/2010 | Sim |
| 7,797,199 B2 | 9/2010 | Forshaw et al. |
| 7,801,760 B2 | 9/2010 | Handel et al. |
| 7,806,328 B2 | 10/2010 | Chakravarthy |
| 7,814,029 B1 | 10/2010 | Siegel |
| 7,844,488 B2 | 11/2010 | Merriman et al. |
| 7,844,490 B2 | 11/2010 | Patterson |
| 7,865,513 B2 | 1/2011 | Welch et al. |
| 7,870,022 B2 | 1/2011 | Bous et al. |
| 7,885,862 B1 | 2/2011 | Vincent et al. |
| 7,899,704 B1 | 3/2011 | Thompson |
| 7,925,540 B1 | 4/2011 | Orttung et al. |
| 7,933,810 B2 | 4/2011 | Morgenstern |
| 7,937,330 B2 | 5/2011 | Handel et al. |
| 7,941,374 B2 | 5/2011 | Orttung et al. |
| 7,958,017 B1 | 6/2011 | Rempe et al. |
| 7,962,381 B2 | 6/2011 | Handel et al. |
| 7,966,213 B2 | 6/2011 | Messa et al. |
| 7,970,666 B1 | 6/2011 | Handel |
| 7,991,664 B1 | 8/2011 | Stone |
| 8,070,056 B2 | 12/2011 | Feldman et al. |
| 8,073,719 B2 | 12/2011 | Orttung et al. |
| 8,078,496 B2 | 12/2011 | Postrel |
| 8,082,270 B2 | 12/2011 | Goyal |
| 8,090,707 B1 | 1/2012 | Orttung et al. |
| 8,095,402 B2 | 1/2012 | Orttung et al. |
| 8,108,304 B2 | 1/2012 | Loeger et al. |
| 8,117,073 B1 | 2/2012 | Orttung et al. |
| 8,121,953 B1 | 2/2012 | Orttung et al. |
| 8,126,771 B2 | 2/2012 | Walker et al. |
| 8,126,776 B2 | 2/2012 | Messa et al. |
| 8,131,588 B2 | 3/2012 | Walker et al. |
| 8,140,387 B2 | 3/2012 | Heywood |
| 8,145,522 B2 | 3/2012 | Warren et al. |
| 8,160,922 B2 | 4/2012 | Postrel |
| 8,170,916 B1 | 5/2012 | Dicker et al. |
| 8,175,926 B1 | 5/2012 | Handel et al. |
| 8,180,682 B2 | 5/2012 | Narayanaswami et al. |
| 8,180,796 B1 | 5/2012 | Mah et al. |
| 8,213,423 B1 | 7/2012 | Breau et al. |
| 8,249,934 B2 | 8/2012 | Agarwal et al. |
| 8,438,061 B2 | 5/2013 | Grimes |
| 8,459,551 B2 | 6/2013 | Lee et al. |
| 8,463,643 B2 | 6/2013 | Bennett et al. |
| 8,463,706 B2 | 6/2013 | Cervenka et al. |
| 8,463,851 B2 | 6/2013 | Bennett et al. |
| 8,468,053 B2 | 6/2013 | Bennett et al. |
| 8,473,334 B2 | 6/2013 | Gibbs et al. |
| 8,484,088 B1 | 7/2013 | Orttung et al. |
| 8,484,093 B2 | 7/2013 | Bennett et al. |
| 8,489,452 B1 | 7/2013 | Warner et al. |
| 8,489,456 B2 | 7/2013 | Burgess et al. |
| 8,494,901 B2 | 7/2013 | Magadi et al. |
| 8,494,914 B2 | 7/2013 | Mesaros |
| 8,504,411 B1 | 8/2013 | Subasic et al. |
| 8,504,423 B2 | 8/2013 | Rotbard et al. |
| 8,515,810 B2 | 8/2013 | Grimes |
| 8,517,258 B2 | 8/2013 | Taylor et al. |
| 8,543,470 B2 | 9/2013 | Grady et al. |
| 8,554,670 B1 | 10/2013 | Blank et al. |
| 8,560,389 B2 | 10/2013 | Burgess et al. |
| 8,573,477 B2 | 11/2013 | Bennett et al. |
| 8,573,491 B2 | 11/2013 | Bennett et al. |
| 8,606,630 B2 | 12/2013 | Fordyce, III et al. |
| 8,615,426 B2 | 12/2013 | Carlson |
| 8,621,215 B1 | 12/2013 | Iyer |
| 8,626,579 B2 | 1/2014 | Fordyce, III et al. |
| 8,639,567 B2 | 1/2014 | Winters |
| 8,650,071 B2 | 2/2014 | Pointer et al. |
| 8,655,695 B1 | 2/2014 | Qu et al. |
| 8,725,635 B2 | 5/2014 | Klein et al. |
| 8,874,674 B2 | 10/2014 | Allison et al. |
| 9,009,082 B1 | 4/2015 | Marshall et al. |
| 9,031,866 B1 | 5/2015 | Ng et al. |
| 9,430,773 B2 | 8/2016 | Aloni et al. |

(56) References Cited

U.S. PATENT DOCUMENTS

| | | |
|---|---|---|
| 2001/0003725 A1 | 6/2001 | Wolff et al. |
| 2001/0014868 A1 | 8/2001 | Herz et al. |
| 2001/0054003 A1 | 12/2001 | Chien et al. |
| 2002/0008292 A1 | 1/2002 | Hu et al. |
| 2002/0052841 A1 | 5/2002 | Guthrie et al. |
| 2002/0069079 A1 | 6/2002 | Vega |
| 2002/0069312 A1 | 6/2002 | Jones |
| 2002/0095357 A1 | 7/2002 | Hunter et al. |
| 2002/0099824 A1 | 7/2002 | Bender et al. |
| 2002/0138343 A1 | 9/2002 | Weatherford et al. |
| 2002/0178056 A1* | 11/2002 | Lim ............... G06Q 30/02 705/14.2 |
| 2002/0194069 A1 | 12/2002 | Thakur et al. |
| 2003/0027630 A1 | 2/2003 | Kelly et al. |
| 2003/0028426 A1 | 2/2003 | Banerjee et al. |
| 2003/0028518 A1 | 2/2003 | Mankoff |
| 2003/0033211 A1 | 2/2003 | Haines et al. |
| 2003/0061093 A1 | 3/2003 | Todd |
| 2003/0078832 A1 | 4/2003 | Alvarez et al. |
| 2003/0208442 A1 | 11/2003 | Cockrill et al. |
| 2003/0233278 A1 | 12/2003 | Marshall |
| 2004/0039686 A1 | 2/2004 | Klebanoff |
| 2004/0098326 A1 | 5/2004 | James et al. |
| 2004/0098332 A1 | 5/2004 | Dvir |
| 2004/0122736 A1 | 6/2004 | Strock et al. |
| 2004/0015338 A1 | 8/2004 | Lortscher, Jr. |
| 2004/0215517 A1 | 10/2004 | Chen et al. |
| 2004/0225509 A1 | 11/2004 | Andre |
| 2004/0225573 A1 | 11/2004 | Ling |
| 2004/0243468 A1 | 12/2004 | Cohagan et al. |
| 2005/0010394 A1 | 1/2005 | Bergeron et al. |
| 2005/0010428 A1 | 1/2005 | Bergeron et al. |
| 2005/0010472 A1 | 1/2005 | Quatse et al. |
| 2005/0021401 A1 | 1/2005 | Postrel |
| 2005/0033583 A1 | 2/2005 | Bergeron et al. |
| 2005/0033605 A1 | 2/2005 | Bergeron et al. |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1 | 3/2005 | Bortolin et al. |
| 2005/0071230 A1 | 3/2005 | Mankoff |
| 2005/0075932 A1 | 4/2005 | Mankoff |
| 2005/0096976 A1 | 5/2005 | Nelms |
| 2005/0149394 A1 | 7/2005 | Postrel |
| 2005/0159996 A1 | 7/2005 | Lazarus et al. |
| 2005/0165684 A1 | 7/2005 | Jensen et al. |
| 2005/0192863 A1 | 9/2005 | Mohan |
| 2005/0234753 A1 | 10/2005 | Pinto et al. |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0008524 A1 | 1/2006 | Chen et al. |
| 2006/0026067 A1 | 2/2006 | Nicholas et al. |
| 2006/0041480 A1 | 2/2006 | Briggs |
| 2006/0064372 A1 | 3/2006 | Gupta |
| 2006/0074749 A1 | 4/2006 | Kline et al. |
| 2006/0076400 A1 | 4/2006 | Fletcher |
| 2006/0095434 A1 | 5/2006 | Mccullough et al. |
| 2006/0111930 A1 | 5/2006 | Ayer et al. |
| 2006/0116800 A1 | 6/2006 | Obradovich et al. |
| 2006/0122874 A1 | 6/2006 | Postrel |
| 2006/0129426 A1 | 6/2006 | Pearson |
| 2006/0136299 A1 | 6/2006 | Ruhmkorf |
| 2006/0155641 A1 | 7/2006 | Postrel |
| 2006/0167753 A1 | 7/2006 | Teague et al. |
| 2006/0173672 A1 | 8/2006 | Bergeron et al. |
| 2006/0178932 A1 | 8/2006 | Lang |
| 2006/0195359 A1 | 8/2006 | Robinson et al. |
| 2006/0212355 A1* | 9/2006 | Teague ............... G06Q 30/02 705/14.16 |
| 2006/0224449 A1 | 10/2006 | Byerley et al. |
| 2006/0241859 A1 | 10/2006 | Kimchi et al. |
| 2006/0242011 A1 | 10/2006 | Bell et al. |
| 2006/0258397 A1 | 11/2006 | Kaplan et al. |
| 2006/0259364 A1 | 11/2006 | Strock et al. |
| 2006/0271552 A1 | 11/2006 | Mcchesney et al. |
| 2006/0293957 A1 | 12/2006 | Petersen et al. |
| 2007/0000997 A1 | 1/2007 | Lambert et al. |
| 2007/0010942 A1 | 1/2007 | Bill |
| 2007/0022019 A1 | 1/2007 | Sherwin et al. |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0050258 A1 | 3/2007 | Dohse |
| 2007/0061216 A1 | 3/2007 | Jain et al. |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1 | 4/2007 | Bufford et al. |
| 2007/0129995 A1 | 6/2007 | Brandow |
| 2007/0130010 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0157237 A1 | 7/2007 | Cordray et al. |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0198937 A1 | 8/2007 | Paris |
| 2007/0208879 A1 | 9/2007 | Liu |
| 2007/0210152 A1 | 9/2007 | Read |
| 2007/0214040 A1 | 9/2007 | Patel et al. |
| 2007/0233517 A1 | 10/2007 | Dayal |
| 2007/0244741 A1 | 10/2007 | Blume et al. |
| 2007/0244811 A1 | 10/2007 | Tumminaro |
| 2007/0260513 A1 | 11/2007 | Pavlov |
| 2007/0260523 A1 | 11/2007 | Schadt et al. |
| 2007/0288312 A1 | 12/2007 | Wang |
| 2007/0288372 A1 | 12/2007 | Behar et al. |
| 2008/0003272 A1 | 1/2008 | Rapp et al. |
| 2008/0004917 A1 | 1/2008 | Mortimore |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0033857 A1 | 2/2008 | Moses |
| 2008/0040211 A1 | 2/2008 | Walker et al. |
| 2008/0040288 A1 | 2/2008 | Mortimore et al. |
| 2008/0052140 A1 | 2/2008 | Neal et al. |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0077498 A1* | 3/2008 | Ariff ............... G06Q 20/208 705/14.27 |
| 2008/0082418 A1 | 4/2008 | Fordyce, III et al. |
| 2008/0091445 A1 | 4/2008 | Mihic |
| 2008/0091528 A1 | 4/2008 | Rampell et al. |
| 2008/0091549 A1 | 4/2008 | Chang et al. |
| 2008/0091828 A1 | 4/2008 | Mortimore |
| 2008/0109317 A1 | 5/2008 | Singh |
| 2008/0109489 A1 | 5/2008 | Sherwood |
| 2008/0116260 A1* | 5/2008 | Shafer ............... G06Q 20/12 235/380 |
| 2008/0120129 A1 | 5/2008 | Seubert et al. |
| 2008/0120155 A1 | 5/2008 | Pliha |
| 2008/0133488 A1 | 6/2008 | Bandaru et al. |
| 2008/0147450 A1 | 6/2008 | Mortimore |
| 2008/0147514 A1 | 6/2008 | Shuster et al. |
| 2008/0147773 A1 | 6/2008 | Aaron |
| 2008/0154664 A1 | 6/2008 | Kuo et al. |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |
| 2008/0195609 A1 | 8/2008 | Paris |
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1 | 9/2008 | Plozay et al. |
| 2008/0228580 A1* | 9/2008 | Korman ............... G06Q 30/02 705/14.27 |
| 2008/0255940 A1 | 10/2008 | Perreault et al. |

(56) References Cited

U.S. PATENT DOCUMENTS

| | | |
|---|---|---|
| 2008/0262925 A1 | 10/2008 | Kim et al. |
| 2008/0263135 A1 | 10/2008 | Olliphant |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0281699 A1 | 11/2008 | Whitehead |
| 2008/0281710 A1 | 11/2008 | Hoal |
| 2008/0294624 A1 | 11/2008 | Kanigsberg et al. |
| 2008/0300894 A1 | 12/2008 | John |
| 2008/0300979 A1 | 12/2008 | Abhyanker |
| 2008/0306769 A1 | 12/2008 | Roberts et al. |
| 2008/0313078 A1 | 12/2008 | Payne et al. |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0015027 A1 | 1/2009 | Lambarth et al. |
| 2009/0016322 A1 | 1/2009 | Bell |
| 2009/0018916 A1 | 1/2009 | Seven et al. |
| 2009/0026523 A1 | 1/2009 | Wong et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0032717 A1 | 2/2009 | Aykac et al. |
| 2009/0037264 A1 | 2/2009 | Del Favero et al. |
| 2009/0055292 A1 | 2/2009 | Choon et al. |
| 2009/0063268 A1 | 3/2009 | Burgess et al. |
| 2009/0063351 A1 | 3/2009 | Schmeyer et al. |
| 2009/0076912 A1 | 3/2009 | Rajan et al. |
| 2009/0094048 A1 | 4/2009 | Wallace et al. |
| 2009/0125719 A1 | 5/2009 | Cochran et al. |
| 2009/0132347 A1 | 5/2009 | Anderson et al. |
| 2009/0140799 A1 | 6/2009 | Kasperkovitz |
| 2009/0156310 A1 | 6/2009 | Fargo |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. |
| 2009/0228365 A1 | 9/2009 | Tomchek et al. |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0288140 A1 | 11/2009 | Huber et al. |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327129 A1 | 12/2009 | Collas et al. |
| 2010/0002722 A1 | 1/2010 | Porat et al. |
| 2010/0010656 A1 | 1/2010 | Yotsukura et al. |
| 2010/0010657 A1 | 1/2010 | Do et al. |
| 2010/0011466 A1 | 1/2010 | da Costa e Silva et al. |
| 2010/0014574 A1 | 1/2010 | Homma et al. |
| 2010/0014576 A1 | 1/2010 | Komamura |
| 2010/0017987 A1 | 1/2010 | Lyons |
| 2010/0019157 A1 | 1/2010 | Furlan et al. |
| 2010/0021141 A1 | 1/2010 | Yamashita et al. |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088149 A1 | 4/2010 | Sullivan et al. |
| 2010/0088174 A1 | 4/2010 | Cohagan et al. |
| 2010/0094697 A1 | 4/2010 | Cavanaugh |
| 2010/0094698 A1 | 4/2010 | Cawley |
| 2010/0094699 A1 | 4/2010 | Beal |
| 2010/0106568 A1 | 4/2010 | Grimes |
| 2010/0106596 A1 | 4/2010 | Grimes |
| 2010/0114686 A1 | 5/2010 | Carlson et al. |
| 2010/0131342 A1 | 5/2010 | Thibedeau et al. |
| 2010/0131840 A1 | 5/2010 | Walker et al. |
| 2010/0138299 A1 | 6/2010 | Preston et al. |
| 2010/0145778 A1 | 6/2010 | Fordyce, III et al. |
| 2010/0145786 A1* | 6/2010 | Fordyce, III ........ G06Q 30/0226 705/14.27 |
| 2010/0145798 A1 | 6/2010 | Richards |
| 2010/0145860 A1 | 6/2010 | Pelegero |
| 2010/0153194 A1* | 6/2010 | Oram ................ G06Q 40/12 705/14.1 |
| 2010/0203963 A1 | 8/2010 | Allen et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0312629 A1 | 12/2010 | Wolf et al. |
| 2010/0325048 A1 | 12/2010 | Carlson et al. |
| 2010/0332307 A1 | 12/2010 | Parento |
| 2011/0000449 A1 | 1/2011 | Mortimore, Jr. et al. |
| 2011/0002936 A1 | 1/2011 | Ferlin et al. |
| 2011/0004546 A1* | 1/2011 | Thomas ............ G06Q 20/384 705/39 |
| 2011/0016115 A1 | 1/2011 | Craswell et al. |
| 2011/0019115 A1 | 1/2011 | Jun et al. |
| 2011/0022448 A1 | 1/2011 | Strock et al. |
| 2011/0022455 A1 | 1/2011 | Wolf et al. |
| 2011/0022503 A1 | 1/2011 | Parker-Yules |
| 2011/0029364 A1 | 2/2011 | Roeding et al. |
| 2011/0029367 A1* | 2/2011 | Olson ................ G06Q 30/0224 705/14.25 |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0083101 A1 | 4/2011 | Sharon et al. |
| 2011/0087530 A1 | 4/2011 | Fordyce, III et al. |
| 2011/0087531 A1 | 4/2011 | Winters et al. |
| 2011/0093327 A1 | 4/2011 | Fordyce, III et al. |
| 2011/0093335 A1 | 4/2011 | Fordyce, III et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | Macilwaine et al. |
| 2011/0131077 A1 | 6/2011 | Tan |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161172 A1 | 6/2011 | Lee |
| 2011/0167440 A1 | 7/2011 | Greenfield |
| 2011/0178845 A1 | 7/2011 | Rane et al. |
| 2011/0178928 A1 | 7/2011 | Carmichael et al. |
| 2011/0184792 A1 | 7/2011 | Butcher et al. |
| 2011/0213670 A1 | 9/2011 | Strutton et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246219 A1 | 10/2011 | Smith et al. |
| 2011/0246272 A1* | 10/2011 | Joa ................ G06Q 30/0224 705/14.17 |
| 2011/0246279 A1* | 10/2011 | Joa ................ G06Q 30/0224 705/14.25 |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |

(56) References Cited

U.S. PATENT DOCUMENTS

| | | |
|---|---|---|
| 2011/0251891 A1 | 10/2011 | Satyavolu et al. |
| 2011/0251934 A1 | 10/2011 | Satyavolu et al. |
| 2011/0258011 A1 | 10/2011 | Burns et al. |
| 2011/0258027 A1* | 10/2011 | Lee .................... G06Q 30/0226 705/14.23 |
| 2011/0264490 A1 | 10/2011 | Durvasula et al. |
| 2011/0270617 A1 | 11/2011 | Anto et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295749 A1 | 12/2011 | Scalisi |
| 2011/0302011 A1 | 12/2011 | Yoder et al. |
| 2011/0307509 A1 | 12/2011 | Hsiao et al. |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0000496 A1 | 1/2012 | Satyavolu et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029990 A1 | 2/2012 | Fisher |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Jacob Sushil et al. |
| 2012/0046958 A1 | 2/2012 | Pynadath et al. |
| 2012/0047008 A1 | 2/2012 | Alhadeff et al. |
| 2012/0053987 A1 | 3/2012 | Satyavolu et al. |
| 2012/0059701 A1 | 3/2012 | Van Der Veen et al. |
| 2012/0066037 A1 | 3/2012 | Glen |
| 2012/0066046 A1 | 3/2012 | Satyavolu et al. |
| 2012/0066050 A1* | 3/2012 | Satyavolu ........... G06Q 30/0224 705/14.27 |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Theresa et al. |
| 2012/0109751 A1 | 5/2012 | Binenstock et al. |
| 2012/0130737 A1 | 5/2012 | Finizio et al. |
| 2012/0150641 A1 | 6/2012 | Dobbs et al. |
| 2012/0150740 A1 | 6/2012 | Isaacson et al. |
| 2012/0196568 A1 | 8/2012 | Bakshi |
| 2012/0197707 A1 | 8/2012 | Cohagan et al. |
| 2012/0197887 A1 | 8/2012 | Anderson |
| 2012/0203604 A1 | 8/2012 | Baker et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221400 A1* | 8/2012 | Tietzen .............. G06Q 30/0241 705/14.27 |
| 2012/0221437 A1 | 8/2012 | Yoo |
| 2012/0221479 A1 | 8/2012 | Schneck, III et al. |
| 2012/0226530 A1 | 9/2012 | Gebb et al. |
| 2012/0239417 A1 | 9/2012 | Pourfallah et al. |
| 2012/0239479 A1 | 9/2012 | Amaro et al. |
| 2012/0246004 A1 | 9/2012 | Book et al. |
| 2012/0253852 A1 | 10/2012 | Pourfallah et al. |
| 2012/0253957 A1 | 10/2012 | Bakshi |
| 2012/0271691 A1 | 10/2012 | Hammad et al. |
| 2012/0278127 A1 | 11/2012 | Kirakosyan et al. |
| 2012/0296673 A1 | 11/2012 | Faro et al. |
| 2012/0303425 A1 | 11/2012 | Katzin et al. |
| 2012/0303430 A1 | 11/2012 | Tiku et al. |
| 2013/0006737 A1 | 1/2013 | Goldberg |
| 2013/0006766 A1 | 1/2013 | Dedeoglu et al. |
| 2013/0013396 A1 | 1/2013 | Vinson et al. |
| 2013/0024256 A1 | 1/2013 | Wolf et al. |
| 2013/0024274 A1 | 1/2013 | Villars |
| 2013/0040654 A1 | 2/2013 | Parish |
| 2013/0041902 A1 | 2/2013 | Swann et al. |
| 2013/0060623 A1 | 3/2013 | Walker et al. |
| 2013/0060644 A1 | 3/2013 | Le Ouay et al. |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0080239 A1* | 3/2013 | Okerlund ........... G06Q 30/0226 705/14.33 |
| 2013/0080259 A1 | 3/2013 | Durvasula et al. |
| 2013/0091000 A1 | 4/2013 | Hagey et al. |
| 2013/0103472 A1 | 4/2013 | Burgess et al. |
| 2013/0110555 A1 | 5/2013 | Dunham et al. |
| 2013/0110604 A1 | 5/2013 | Rooke et al. |
| 2013/0124283 A1 | 5/2013 | Kaulbach et al. |
| 2013/0132175 A1 | 5/2013 | Claessen et al. |
| 2013/0132183 A1 | 5/2013 | Klein et al. |
| 2013/0145016 A1 | 6/2013 | Vantalon et al. |
| 2013/0151602 A1 | 6/2013 | Mcclelland et al. |
| 2013/0019119 A1 | 7/2013 | Mark et al. |
| 2013/0173320 A1 | 7/2013 | Bank et al. |
| 2013/0173478 A1 | 7/2013 | Farhi |
| 2013/0179246 A1 | 7/2013 | Ross |
| 2013/0212177 A1 | 8/2013 | Friedman |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Boyer et al. |
| 2013/0262214 A1* | 10/2013 | Baird ................. G06Q 30/0207 705/14.33 |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1 | 12/2013 | Allison et al. |
| 2013/0346170 A1 | 12/2013 | Epstein et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046675 A1 | 2/2014 | Harwood et al. |
| 2014/0046744 A1 | 2/2014 | Hagey |
| 2014/0046748 A1 | 2/2014 | Nagarajan et al. |
| 2014/0046794 A1 | 2/2014 | Vallery et al. |
| 2014/0108108 A1 | 4/2014 | Artman et al. |
| 2014/0108521 A1 | 4/2014 | Marquess et al. |
| 2014/0149200 A1* | 5/2014 | Chatterjee ......... G06Q 30/0226 705/14.33 |
| 2014/0164199 A1 | 6/2014 | Wilkes |
| 2014/0258032 A1 | 9/2014 | Psota et al. |
| 2015/0039393 A1 | 2/2015 | Jain |
| 2015/0073980 A1 | 3/2015 | Griffin et al. |
| 2015/0170256 A1 | 6/2015 | Pettyjohn et al. |
| 2015/0248702 A1 | 9/2015 | Chatterton |

(56) References Cited

U.S. PATENT DOCUMENTS

| | | | |
|---|---|---|---|
| 2016/0086212 A1* | 3/2016 | Tietzen | G06Q 30/0226 |
| | | | 705/14.27 |
| 2016/0253737 A1* | 9/2016 | Chang | G06Q 30/0204 |
| | | | 705/26.7 |
| 2020/0193470 A1* | 6/2020 | Chatterjee | G06Q 30/0226 |

OTHER PUBLICATIONS

Todorova, Aleksandra, "The Best Rewards Programs," www.smartmoney.com, Sep. 2005, pp. 1-2.
Quora, What is a token in programming? Available at https://www.quora.com/What-is-a-token-in-programming.

* cited by examiner

DYNAMIC REWARDS PROGRAM

FIELD

The present disclosure generally relates to administering a rewards program. More specifically, the present disclosure relates to administering a dynamically provisioned reward system.

BACKGROUND

Traditional reward systems provide users with rewards from a fixed pool of rewards. This pool is usually provided to the rewards system when the rewards program is established. Thereafter, the rewards may be provided to user by randomly selecting the reward from the pool. However, because the pool of rewards is usually provided at the outset of the rewards program, the high value rewards may all be provided to certain users at the outset of the rewards program. If the high value rewards are already distributed, users may be less inclined to engage in the activities required to earn the rewards. As such, there is a need to improve the reward distribution in rewards programs.

SUMMARY

In various embodiments, the systems, methods, and computer program products (collectively "systems") described herein are generally configured to administer rewards. The system may be configured to create a rewards program that comprises a duration. The system may distribute a first plurality of rewards in a rewards pool associated with the rewards program, based on a first distribution trigger within the duration associated with the rewards program (e.g., at the time period when the rewards program is created). The system may determine a reward from the first plurality of rewards. The reward may be associated with a transaction account based on an activity associated with the transaction account. The system may also distribute a second plurality of rewards into the rewards pool associated with the rewards program based on a second distribution trigger with the duration associated with the rewards program.

In various embodiments, the first distribution trigger and/or the second distribution trigger may be an average spend level of transactions qualifying for the rewards program, a predetermined period of time, a number of rewards redeemed, a value of rewards provided by the rewards program, a gross transaction value associated with the activities satisfying the rewards program and/or the like.

In various embodiments, the system may distribute a first reward to the transaction account, in response to the activity satisfying a rule. The rule may be associated with the rewards program and/or the first plurality of rewards. The system may also be capable of receiving activity information describing the activity associated with the transaction account.

BRIEF DESCRIPTION OF THE DRAWINGS

The features and advantages of the present disclosure will become more apparent from the detailed description set forth below when taken in conjunction with the drawings.

DETAILED DESCRIPTION

Figure 1:
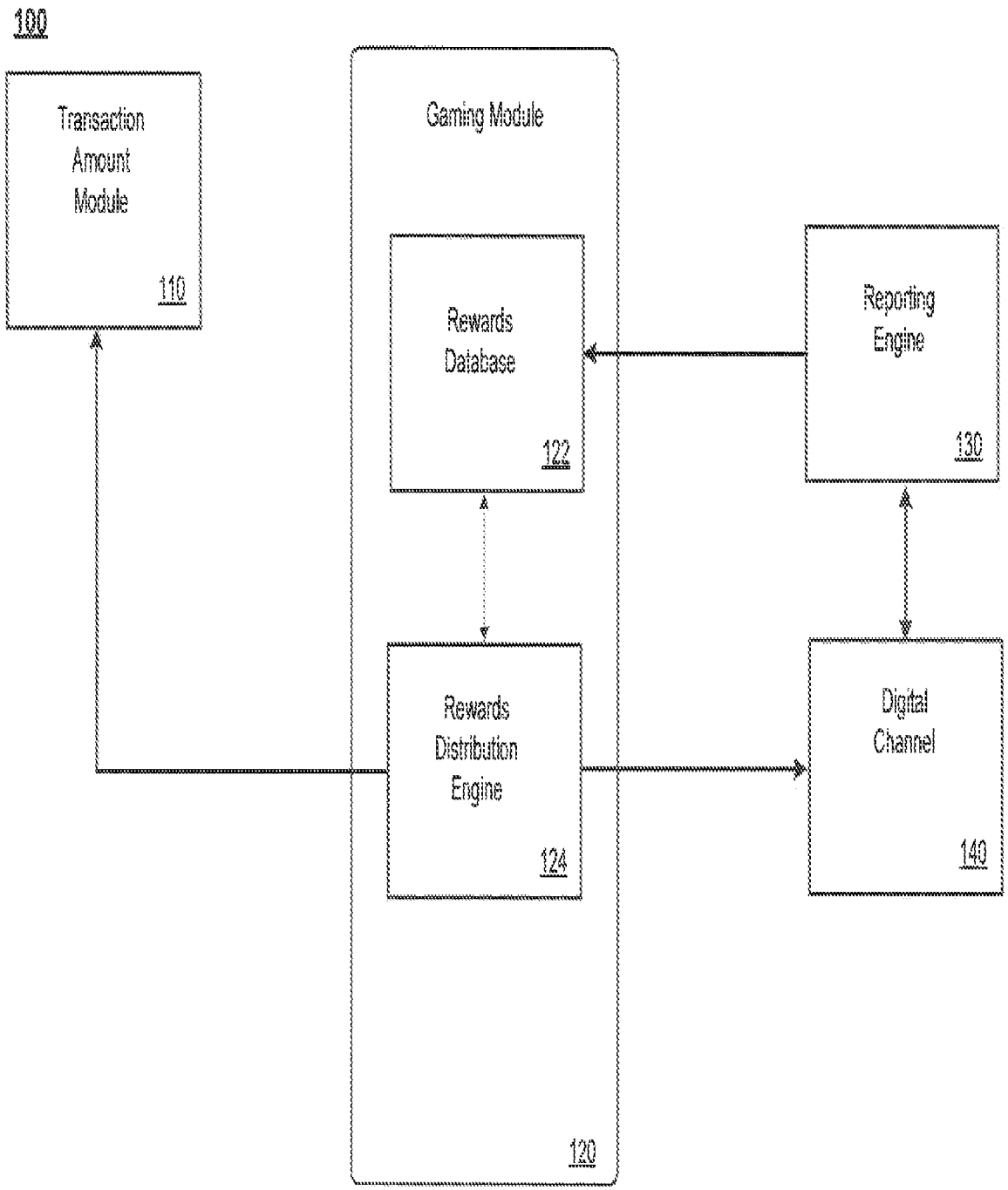
FIG. 1 is a system diagram showing various elements of a rewards system in accordance with various embodiments.

In various embodiments, the systems, methods and computer program products (collectively "system") described herein provide consumers with the ability to earn rewards based on a consumer's activities (e.g., transactions, purchases, etc.) in a digital channel. Moreover, the rewards system is configured to dynamically distribute one or more subsets of rewards to a rewards program.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember and/or the like shall include any person, entity, business, government organization, business, software, hardware, machine associated with a transaction account, buys merchant offerings offered by one or more merchants using the account and/or is designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "item" may include any good, service, merchant, information, experience, data, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

In various embodiments and as used herein, a digital channel may be any suitable channel available to a user over a network, including for example, a social media channel, an entertainment channel, a service channel, a review channel, a service scheduling channel, and/or the like. The channel may include a user interface and user account that may be created by a user. Moreover, the user may be able to access the digital channel through a web client on any suitable electronic device. The digital channel may also be considered a non-traditional purchasing channel (e.g., a channel where information about an item may be present, but where the ability to purchase the item is not available (e.g., social media channel information for an item)).

As used herein, a "merchant" may be any person or entity capable of providing a service or an item. A merchant may distribute the item in any way, for example, by exchanging the item for payment. The merchant may be capable of accepting the payment through any suitable payment channel including traditional payment channels including, for example, POS terminals, online payments terminals, transaction account networks and the like. The merchant may also accept payment through non-traditional payment terminals including, for example, social media channels, person to person payments. Further information about person to person payments is described in U.S. patent application Ser. No. 13/640,216, entitled Systems and Methods for Transferring Value via a Social Network, which is herein incorporated by reference in its entirety for any purpose.

In various embodiments, the rewards systems described herein may be configured to dynamically provision rewards to a rewards program. This dynamic provisioning allows the rewards system to distribute high value, medium value and low value rewards to the rewards program throughout the duration of the program. This allows the program to randomly distribute rewards for purchases and provides consumers with a chance to earn a high value, medium value, or low value reward at any time during the duration of the rewards program. "Value" as used herein may include monetary value, sentimental value, experience value, educational value, emotional value, cultural value and/or the like.

In various embodiments, and with reference to FIG. 1, a system 100 may comprise various hardware and software components including for example, a transaction account module 110, a gaming module 120, a reporting engine 130, and a digital channel 140. Transaction account module 110 may be any suitable system configured to receive, analyze, track, distribute or otherwise process transaction associated with transaction accounts. Gaming module 120 may be configured to select, manage, store, distribute, or otherwise administer rewards and/or a rewards program. Moreover, gaming module 120 may be couple to or in communication with transaction account module 110, reporting engine 130 and/or digital channel 140. Reporting engine 130 may be configured to track, report, collect reward data, analyze reward data and/or provide notification of rewards. Moreover, reporting engine 130 and/or transaction account module 110 may be configured to track the activity of a specific transaction account. For example, in response to the rewards program having no limit on the number of times a consumer may receive a reward, reporting engine 130 and/or transaction account module 110 may be configured to monitor statistics associated with the award or redemption of a reward. In response to a reward program including a limit on the number of times a consumer may be awarded or redeem a reward, reporting engine 130 and/or transaction account module 110 may track and prohibit a consumer from receive a reward based on a previous reward, award, and/or redemption. For example, reporting engine 130 and/or transaction account module 110 may associate an indicator with a transaction account or profile of a consumer based on the tracking. Digital channel 140 may be configured to provide access to system 100, provide data to system 100, receive data from system 100 and/or the like.

Gaming module 120 may comprise rewards database 122 and rewards distribution engine 124. Rewards database 122 may be configured to receive, distribute, parse, and/or store rewards. Rewards distribution engine 124 may be operably coupled to or in electronic communication with rewards database 122. Rewards distribution engine 124 may be configured to group and/or create subsets of rewards. Moreover, rewards distribution engine may be configured to monitor and/or analyze activities associated with the rewards program. This monitoring or analysis may allow rewards distribution engine 124 to populate or provision subsets or rewards to the rewards program in response to activities associated with the rewards program.

Figure 2:
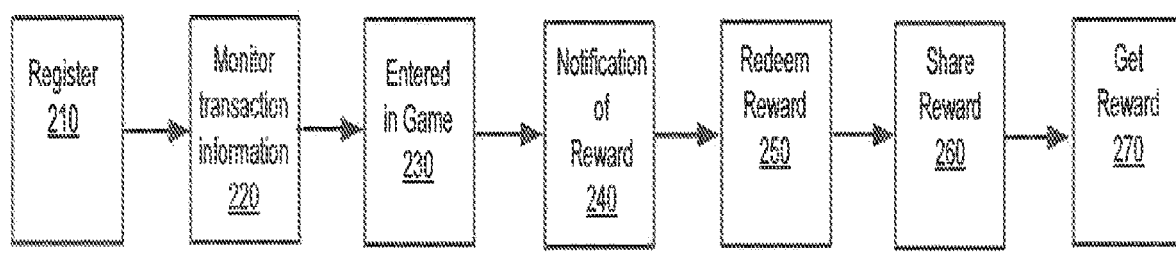
FIG. 2 shows an overview of a rewards process in accordance with various embodiments.

In various embodiments, and with reference to FIGS. 1 and 2, system 100 may be configured to administer a rewards program in accordance with process 200. Transaction account module may be configured to associated, sync or otherwise register a transaction account with the reward program (Step 210). This process may be accomplished by any suitable method as described herein and/or discussed in greater detail with respect to FIG. 3. In response to registering with the rewards program, transaction module may receive activity information (e.g., transaction information such as, for example, authorizations and/or completed transactions) associated with the registered or synced transaction account from purchases at various merchants (Step 220). The activity or transaction information may be analyzed by transaction account module 110 to identify one or more transactions associated with a transaction account that comply with the rules governing a reward program. The rewards program may be defined such that every transaction that satisfies the rules governing a reward program is eligible for a reward and/or is rewarded. As a result, each transaction that complies with the rules of the reward program may be entered in the game that defines or selects the reward for the consumer associated with the transaction account (Step 230). To enter the consumer based on the qualifying transaction information, transaction account module 110 may provide consumer and/or transaction identifying information to gaming module 120.

In response to the reward program providing a reward to a consumer based on a qualifying transaction, gaming module 120 may access or request a reward from rewards distribution engine 124. Based on the request and/or the identifying information, rewards distribution engine may select one or more rewards from rewards database 122. In response to the selecting of the reward, gaming module 120 may provide reward information to reporting engine 130. Reward information may include, for example, information describing the reward, instructions for providing the reward to the consumer, the transaction associated with the reward, the transaction account associated with the reward, reward statistical information, transaction statistical information, and/or the like. Based on the reward information, reporting engine 130 may provide a notification to the consumer through a digital channel, as an e-mail, or by any other suitable communication mechanism (step 240).

The notification of the reward may provide the consumer with instructions and/or a mechanism (e.g., a hyperlink, code, and/or the like) to redeem the reward (Step 250). The reward may be redeemed at a sponsoring merchant (e.g., a merchant who funded the reward) and/or through an identified channel 140 (e.g., a social media channel). The reward may further include the option to share or distribute portions of the reward. The notification may include instructions for distributing or sharing portions of the reward. For example, a reward having a monetary value (e.g., $500 credit) may be provided to a consumer through a social media channel. The reward may be further defined in portions such that the consumer is provided with a portion that can be used by the consumer and one or more portions that can be shared by the consumer. Using the $500 credit as an example, the reward may provide that a portion (e.g., $200) is for the consumer and three additional rewards (e.g., three rewards of $100 credit) may be shared by the consumer. In response to the reward being provided in a social media channel, the portions of the reward may be shared through the social media channel by the consumer (Step 260).

For example, if the reward were provided through a social media channel such as FACEBOOK, the consumer may be able to designate one or more recipients who are associated with the consumer FACEBOOK profile to receive rewards. Moreover, the consumer may be able to define parameters associated with the portions of the reward that are to be shared. For example, the consumer may be able to define an action to be completed in the channel to receive the shared portion of the reward (e.g., a like, a broadcast, an interest selection, and/or the like). Moreover, the reward notification may provide that recipients of the portions of the shared reward take an action (e.g., an action with a merchant, an action in a channel, sync a transaction account with the reward program, and/or the like) to receive the shared portion of the reward. Further and based on the notification and/or redemption, the consumer may receive the reward (Step 270).

Figure 3:
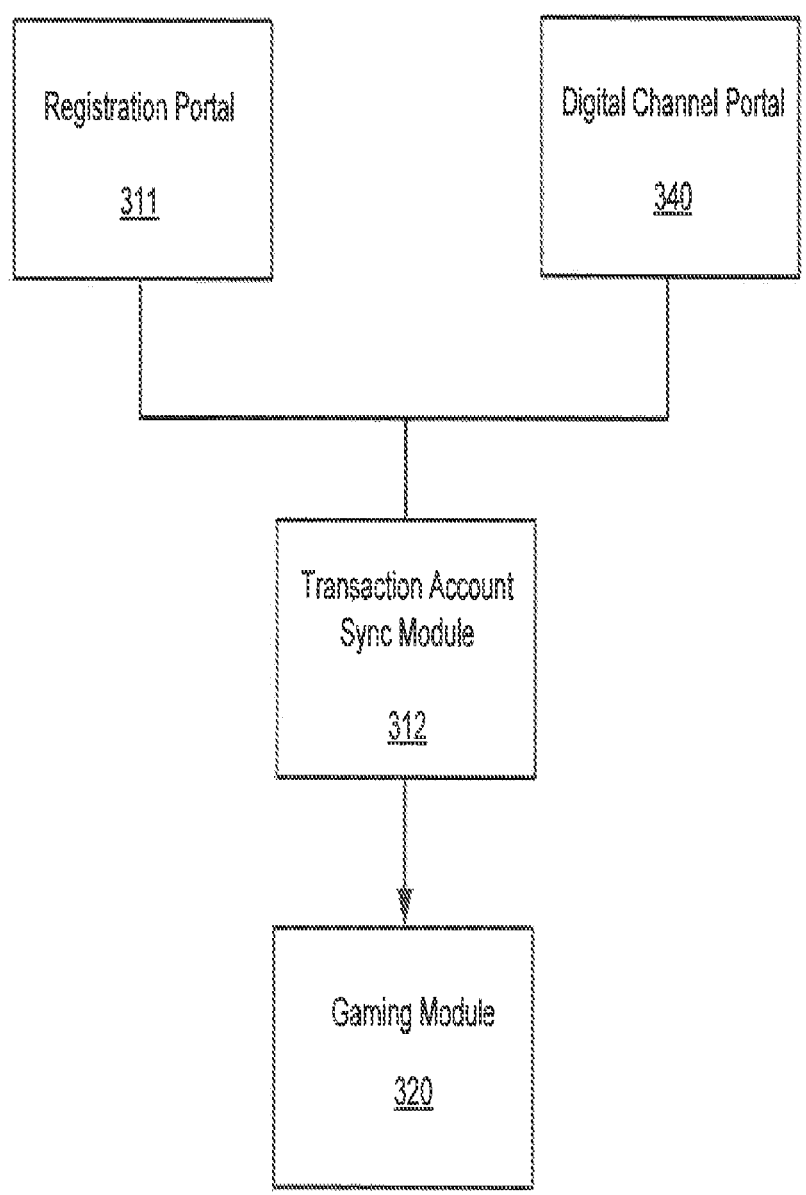
FIG. 3 shows a system for syncing a transaction account with a rewards system in accordance with various embodiments.

In various embodiments, and with reference to FIG. 3, a system 300 may be a portion of and/or operably connected to system 100. In various embodiments, system 300 may comprise a registration portal 311, a transaction account sync module 312, a gaming module 320, and/or a digital channel portal 340. System 300 may be capable of associating a transaction account with a rewards program and/or a consumer profile for a channel and providing that association to gaming module 320. More specifically, system 300 may be configured to associate activities (e.g., transactions) with a transaction account and communicate those activities to a reward program (e.g., gaming module 320).

System 300 may receive transaction account information through at least one of a registration portal 311 and/or a digital channel portal 340. Registration portal 311 may be provided by a reward program administrator or a transaction account issuer associated with a reward program. Digital channel portal 340 may be accessible by a user and/or provided through a merchant website, a digital channel, and/or the like. The registration portal 311 and/or digital channel portal 340 may be capable of collecting, storing, recording, transmitting and/or processing registration information (e.g., transaction account information). Registration portal 311 and/or digital channel portal 340 may be further capable of providing the registration information to transaction account sync module 312. For example, system 300 and or registration portal 311 may be associated with a payment processor (e.g., transaction account issuer). In this example, registration portal 311 may request the transaction account information through a channel provided by the transaction account issuer (e.g., a transaction account issuer website). The transaction account information may also be captured through digital channel portal 340 at digital channel 140 by a digital channel provider, a third party, or by system 300. The transaction account information may be captured through a fillable form, through an API or other suitable channel interface.

System 300 may also be capable of receiving consumer profile information for a digital channel. As noted above with respect to the transaction account information, the consumer profile information for the channel may be requested by or provided to system 300 through any suitable channel. The consumer profile information may also be provided in conjunction with or at substantially the same time as the transaction account information. For example, in response to the transaction account information being provided to system 300 through the digital channel, the consumer profile information for the channel may be automatically sent with the captured transaction account information. More specifically, the system capturing the data may request that the consumer be logged into or otherwise known to the digital channel in response to providing the transaction account information, such that, the digital channel can automatically provide the consumer profile information with the transaction account information.

System 300 may also receive a token or code associated with a rewards program and/or channel. The token or code may be used to associate the transaction account with a particular rewards program, reward level, and/or digital channel. In various embodiments, system 300 and/or transaction account sync module 312 may be capable of requesting, defining, and/or associating preferences with the transaction account, reward program, and/or consumer profile for the channel. System 300 may allow the consumer to define various preference related to activities, rewards, notification, sharing, purchasing, shipment, offers, and/or the like.

As noted above, system 300 may also allow a consumer to partially or fully define other preferences. For example, system 300 may allow a user to define one or more shipping addresses to facilitate fulfillment of a reward. System 300 may also allow a user to define how rewards are earned, shared, distributed, provided, and the like for transactions and/or purchase events. For additional information on how offers and/or rewards are earned, distributed, and/or provided, see for example, U.S. patent application Ser. No. 13/439,768, filed, Apr. 4, 2012, and entitled System and Method for Providing International Coupon-Less Discounts, U.S. Provisional Patent Application Ser. No. 61/710,461 filed on Mar. 14, 2012 and entitled "GENERATING MERCHANT RECOMMENDATIONS FOR CONSUMERS" and U.S. Provisional Patent Application Ser. No. 61/646,778 filed on May 14, 2012 and entitled "SYSTEMS AND METHODS FOR TAILORED MARKETING BASED ON FILTERING," each of which is incorporated by reference in its entirety for all purposes.

As part of preference selection, system 300 may provide a user with the option to associate multiple channels with a single transaction account or multiple transaction accounts with one or more channels. For example, if a user has several digital channels and/or social media profiles (e.g., Facebook, Foursquare, Twitter, LinkedIn, and/of the like), system 300 may request information for each of the digital channels and/or social media profiles or may provide options for a user to select particular channels and/or profiles to associate with one or more accounts, reward types, reward programs, and/or the like. This central linking capability creates a convenient and efficient solution for the user to link her transaction account(s) with multiple channels through a single interface to facilitate reward sharing, notification and/or the like.

Figure 4:
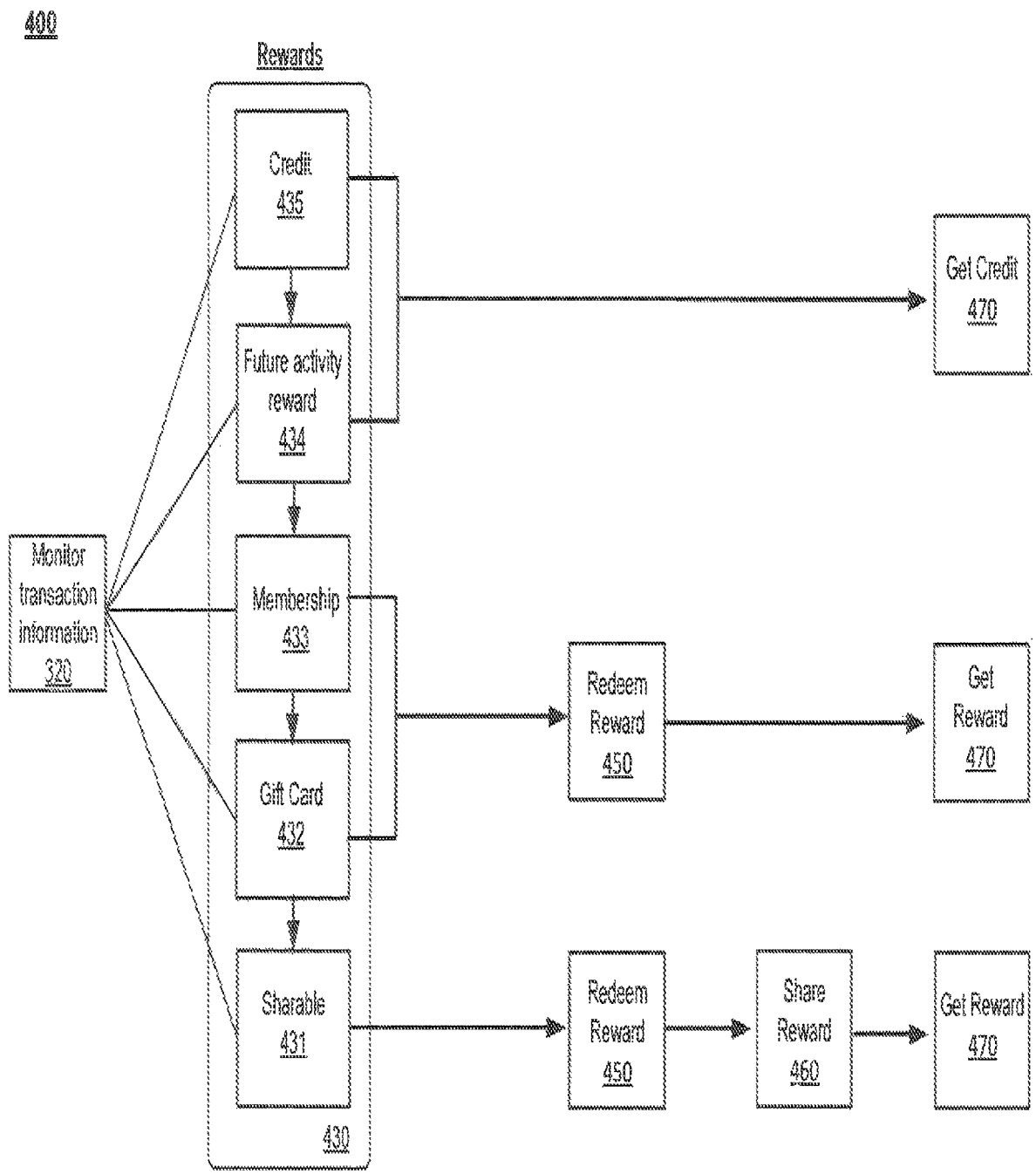
FIG. 4 shows a process for providing dynamically provisioned rewards in accordance with various embodiments.

In various embodiments and with reference to FIGS. 1 and 4, system 100 may be configured to distribute any suitable type of reward in accordance with process 400. In various embodiments, system 100 may be capable of monitoring transaction information. Based on this transaction information, system 100 may provide one or more rewards 430 to a consumer based on the transaction. Reward 430 may be any suitable type of reward including for example, a sharable reward 431, a gift card 432, membership and/or a service 433, a future activity reward 434, and or a credit 435.

System 100 may associate a redemption process for a particular type of reward. For example, in response to a reward being a sharable reward 431, system 100 may require that the consumer redeem the reward (Step 450). Based on the redemption, system 100 may provide one or more option to share the reward (Step 460) through a digital channel or any other suitable mechanism. Based on and/or simultaneously with the sharing action the consumer may also be provided with the consumer's portion of the sharable reward (Step 470).

In response to the reward being a gift card 432 and/or a membership or service 433, system 100 may require that the consumer redeem the reward (Step 450). Because of the nature of the reward, system 100 may request information from the consumer based on the redemption or may evaluate the preferences associated with the consumer's enrollment in the reward program. Based on the information or preferences, system 100 may provide the consumer with the reward (Step 470).

In response to the reward being future activity reward 434 or credit 435, system 100 may provide the reward without requesting additional information from the consumer. For example, where the reward is credit 435, system 100 may provide a statement credit to the transaction account or an instant credit to the transaction based on the authorization (Step 470). This crediting process may be defined by the reward parameters, by the preferences of the consumer, and/or by the preferences of the sponsoring entity, reward program administrator, payment processor, and/or transaction account issuer. Where the reward is future activity reward 434, system 100 may provide a notification or the reward to encourage the consumer to complete the future activity. System 100 may also create a rule associated with the synced and/or registered transaction account such that a future activity that complies with future activity reward 434 provides the reward to the consumer based on the rules associated with the reward, the preferences of the consumer, and/or by the preferences of the sponsoring entity, reward program administrator, payment processor, and/or transaction account issuer (Step 470).

Figure 5:
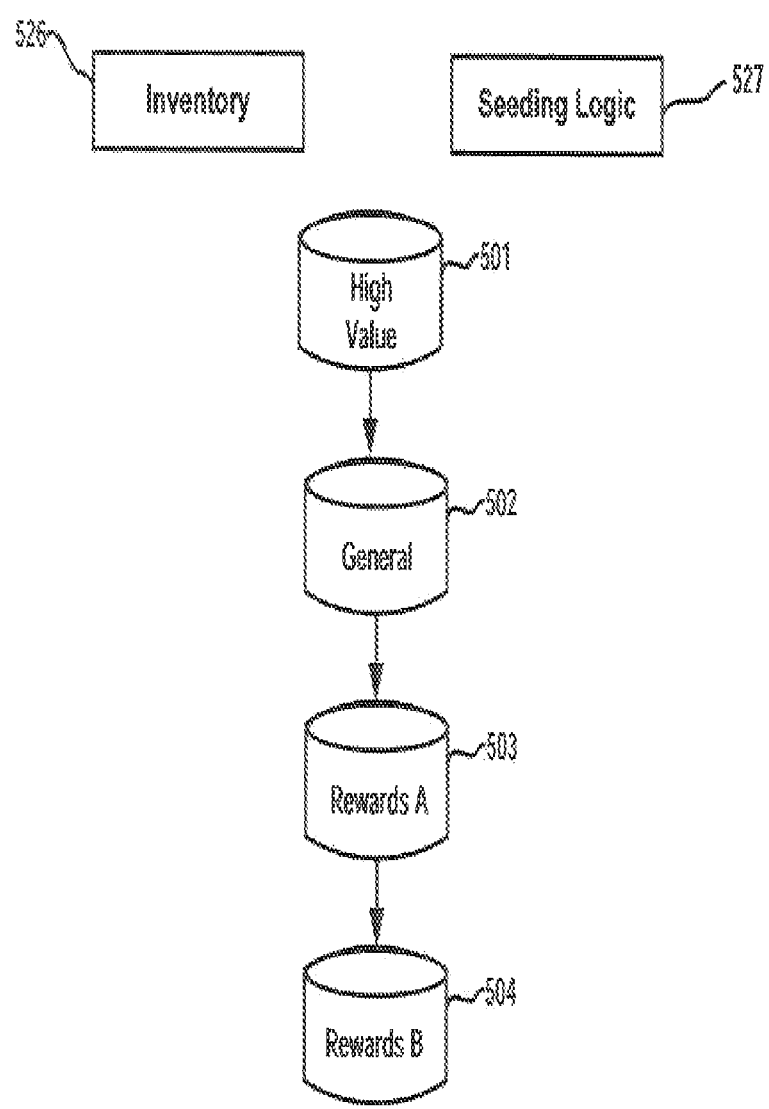
FIG. 5 shows a rewards inventory system in accordance with various embodiments.

In various embodiments and with reference to FIG. 5, gaming module 120 may employ a dynamic reward inventory management process 520. Dynamic reward inventory management process 520 may comprise inventory 526 (e.g., reward inventory) and seeding logic 527. The seeding logic may evaluate and/or categorize the inventory 526 into one or more categories. The dynamic reward inventory management process 520 may, for example, distribute higher value rewards to the pool of available rewards in the rewards program over a time period associated with the reward program or based on reward program activities. This process may insure that gaming module 120 randomly selects rewards from the flexible reward pools, which may dynamically adjust based upon the rules defined in the seeding logic 527. This dynamic nature may insure that game is interesting and adjusts to behaviors of players throughout the duration of the game. This dynamic seeding may provide a random pool of the high value rewards at the outset of a reward program or throughout the reward program depending on the reward program goals and configuration.

In various embodiments, seeding logic may be capable of setting a predetermined distribution of rewards in the rewards program. The distribution may be constant based on the predetermined distribution or may be dynamic based on factors or triggering events associated with the rewards program and defined in the predetermined distribution. For example, the distribution may sequentially distribute rewards in a predetermined order or may dynamically adjust distribution based on consumer activities, merchant goals, consumer behaviors, time periods, seasons, and/or any other suitable events, parameters or factors.

Seeding logic 527 may be configured to distribute rewards into one or more groups (e.g., rewards A 501, rewards B 502, rewards C 503, and/or rewards D 504). In other words, a pool of rewards associated with a rewards program may be divided into sub-pools or subsets of rewards. These sub-pools may further be distributed based on predetermined selections, such that a sub-pool of rewards has a distribution of rewards (e.g., high value rewards, medium, value rewards, and/or low value rewards). The sub-pools may also be divided based on reward value such that a first pool comprises high value rewards, a second pool comprises medium value rewards, and a third pool comprises low value rewards. The rewards may be introduced into the reward program and distributed through the reward program to consumer in any suitable fashion and/or based on any suitable trigger or distribution event.

Gaming module 120 may be configured to select rewards randomly. Seeding logic 527 may be capable of maintaining a pre-defined or dynamically determined distribution of rewards A 501, rewards B 502, rewards C 503, and/or rewards D 504 in the rewards pool for the reward program. This distribution may be pre-defined by the administrator of the reward program. Seeding logic 527 may also be dynamically determined based on the interest associated with the rewards program, a time or year (e.g., a particular consumer season such as "back to school" or "holiday shopping"), an event (e.g., Christmas), activity associated with the rewards program, and/or the like. As a result, system 100 is able to maintain a distribution or level of rewards A 501, rewards B 502, rewards C 503, and/or rewards D 504 to encourage a desired consumer activity.

Seeding logic 527 may also create distribution of rewards of different values in one or more pools or rewards associated with a rewards program (e.g., rewards A 501, rewards B 502, rewards C 503, and/or rewards D 504). In this example, each pool or subset of rewards may comprise some concentration or percentage of high value rewards, medium value rewards, and low value rewards. These rewards in the pools may be introduced into and distributed to consumers from the rewards program sequentially (e.g., the rewards from rewards A 501 may be distributed until all rewards have been distributed to the consumers, then the rewards from rewards B 502 may be distributed until all rewards have been distributed to consumers and so on). The rewards in the pools may also be dynamically introduced into the rewards program and/or distributed to consumers, providing the consumer with a heightened level of interest and a changing probability of receiving a high value reward. Seeding logic 527 may comprise a trigger event that is associating with the dynamic distribution such that dynamic distribution occurs in response to a trigger event. Seeding logic 527 may also be capable of initiating dynamic distribution over a period of time or at any other suitable point.

Moreover, the seeding logic may define or comprise trigger events. The rewards program may comprise a duration (e.g., a time activities that comply with the program are eligible for rewards) and one or more tiger events. These trigger events may cause gaming module 120 to populate a rewards program with a first pool (e.g., subset) of rewards associated with the rewards program from inventory 526 based on seeding logic 527. For example, in response to a first trigger event (e.g., creation of a reward program), gaming module 120 may distribute a portion of inventory 526 to a pool of rewards associated with the rewards program based on seeding logic 527. These rewards may be distributed to consumers based on activities that satisfy the rules associated with the rewards. In response to a tiger event, gaming module 120 may populate the rewards program with a second pool (e.g., subset) of rewards from inventory 526 based on seeding logic 527. This process may continue as additional trigger events are achieved during the duration of the rewards program.

The trigger event associated with the selection of a pool of rewards and/or the populating of a rewards program may be any suitable event. The event may be dynamically determined or predetermined. For example, the trigger event may be a trend or rate of activities associated with a reward program, an average spend level of transactions qualifying for the rewards program, a predetermined period of time, a number of rewards redeemed, a number of activities associated with a sponsoring entity, a value of rewards selected by gaming module 120, a gross transaction value associated with the spend activities, and/or the like.

In various embodiments, seeding logic 527 is defined prior to initiation of the rewards program. In this way consumers are aware of reward distribution parameters prior to participating in the rewards program. Moreover, consumer may be informed of the dynamic nature of seeding logic 527 to insure that a reward program is fair, interesting, and exciting to consumers. In this way, even though a reward distribution shifts and the probability of receiving a high value reward shifts, consumers are aware of the potential shift based on the published and/or predetermined seeding logic 527 and associated distribution plan.

As such, the systems described herein facilitate purchases in digital channels. The systems described herein further facilitate monitor and rewarding activities or accomplishments in a digital channel. The systems described herein further facilitate confirmation or verification of activities in digital channels based on transaction information.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or micro-application (as described below), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/3000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/3000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of the system may be implemented as micro-engines or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (3002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/900-145/SP900-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (3003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvo.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
   assigning, by at least one computing device, a respective monetary value to each of a plurality of rewards in a rewards pool;
   generating, by the at least one computing device, a plurality of value subsets of the plurality of rewards in the rewards pool, each value subset of the plurality of value subsets having a different monetary value threshold for assigning rewards to that value subset based at least in part on the respective monetary values of the rewards;
   receiving, by the at least one computing device, transaction information for a transaction completed with a transaction account, wherein the transaction information comprises at least one of: a key field in a database partitioned by one or more key fields, or a binary large object (BLOB);
   analyzing, by the at least one computing device, the transaction information and the transaction account to determine that the transaction and the transaction account qualifies for a reward;
   randomly selecting, by the at least one computing device and in response to a distribution trigger and based at least in part on at least one preference associated with the transaction account, the reward from the plurality of value subsets of the plurality of rewards in the rewards pool in response to analyzing the transaction information; and
   establishing, by the at least one computing device, access to the reward for the transaction account via a social media channel associated with a sponsoring merchant.

2. The method of claim 1, further comprising dynamically adjusting, by the at least one computing device, a probability of the reward being selected from at least one of the plurality of value subsets.

3. The method of claim 1, wherein the reward includes a first portion usable by an account holder of the transaction account, and at least one second portion sharable by the account holder with at least one different user.

4. The method of claim 1, further comprising providing, by the at least one computing device, reward information to an account holder of the transaction account, wherein the reward information includes information describing at least one of: the reward, the transaction associated with the reward, the transaction account associated with the reward, reward statistical information, or transaction statistical information.

5. The method of claim 1, wherein establishing the access to the reward for the transaction account further comprises sending, by the at least one computing device, an electronic message to an account holder of the transaction account, the electronic message including a link to a website of the sponsoring merchant that provides instructions to obtain the reward from the sponsoring merchant via the social media channel.

6. The method of claim 1, wherein the plurality of value subsets includes a first value subset corresponding to a high monetary value threshold, a second value subset corresponding to a medium monetary value threshold, and a third value subset corresponding to a low monetary value threshold.

7. The method of claim 1, further comprising:
   receiving, by the at least one computing device, a request to share at least a portion of the reward with a second party different from an account holder of the transaction account via the social media channel; and
   transferring, by the at least one computing device, the at least the portion of the reward to the second party in response to the request.

8. The method of claim 7, wherein transferring the at least the portion of the reward is further based at least in part on an action of the second party in the social media channel, and the action includes at least one of: a broadcast in the social media channel or a selection in the social media channel.

9. The method of claim 1, wherein the distribution trigger comprises a first distribution trigger, and the method further comprising transferring, by the at least one computing device, one or more additional rewards into the rewards pool based at least in part on a second distribution trigger.

10. A system, comprising:
at least one computing device; and
instructions executable in the at least one computing device, wherein when executed the instructions cause the at least one computing device to at least:
assign a respective monetary value to each of a plurality of rewards in a rewards pool;
generate a plurality of value subsets of the plurality of rewards in the rewards pool, each value subset of the plurality of value subsets having a different monetary value threshold for assigning rewards to that value subset based at least in part on the respective monetary values of the rewards;
receive transaction information for a transaction completed with a transaction account, wherein the transaction information comprises at least one of: a key field in a database partitioned by one or more key fields, or a binary large object (BLOB);
analyze the transaction information and the transaction account to determine that the transaction and the transaction account qualifies for a reward;
randomly select, in response to a distribution trigger and based at least in part on at least one preference associated with the transaction account, the reward from the plurality of value subsets of the plurality of rewards in the rewards pool in response to analyzing the transaction information; and
establish access to the reward for the transaction account via a social media channel associated with a sponsoring merchant.

11. The system of claim 10, wherein the instructions further cause the at least one computing device to at least dynamically adjust a probability of the reward being selected from at least one of the plurality of value subsets.

12. The system of claim 10, wherein the reward includes a first portion usable by an account holder of the transaction account, and at least one second portion sharable by the account holder with at least one different user.

13. The system of claim 10, wherein the instructions further cause the at least one computing device to at least provide reward statistical information to an account holder of the transaction account.

14. The system of claim 10, wherein the instructions further cause the at least one computing device to at least send an electronic message to an account holder of the transaction account, the electronic message including instructions to obtain the reward from the sponsoring merchant via the social media channel.

15. The system of claim 10, wherein the plurality of value subsets includes a first value subset corresponding to a high monetary value threshold, a second value subset corresponding to a medium monetary value threshold, and a third value subset corresponding to a low monetary value threshold.

16. The system of claim 10, wherein the distribution trigger comprises a first distribution trigger, and the instructions further cause the at least one computing device to at least transfer one or more additional rewards into the rewards pool based at least in part on a second distribution trigger.

17. A non-transitory computer-readable medium embodying instructions executable in at least one computing device, wherein when executed the instructions cause the at least one computing device to at least:
assign a respective monetary value to each of a plurality of rewards in a rewards pool;
generate a plurality of value subsets of the plurality of rewards in the rewards pool, each value subset of the plurality of value subsets having a different monetary value threshold for assigning rewards to that value subset based at least in part on the respective monetary values of the rewards;
receive transaction information for a transaction completed with a transaction account, wherein the transaction information comprises at least one of: a key field in a database partitioned by one or more key fields, or a binary large object (BLOB);
analyze the transaction information and the transaction account to determine that the transaction and the transaction account qualifies for a reward;
randomly select, in response to a distribution trigger and based at least in part on at least one preference associated with the transaction account, the reward from the plurality of value subsets of the plurality of rewards in the rewards pool in response to analyzing the transaction information; and
establish access to the reward for the transaction account via a social media channel associated with a sponsoring merchant.

18. The non-transitory computer-readable medium of claim 17, wherein the reward includes a first portion usable by an account holder of the transaction account, and at least one second portion sharable by the account holder with at least one different user.

19. The non-transitory computer-readable medium of claim 17, wherein when executed the instructions further cause the at least one computing device to at least dynamically adjust a probability of the reward being selected from at least one of the plurality of value subsets.

20. The non-transitory computer-readable medium of claim 17, wherein when executed the instructions further cause the at least one computing device to at least send an electronic message to an account holder of the transaction account, the electronic message including a link to a website of the sponsoring merchant that provides instructions to obtain the reward from the sponsoring merchant via the social media channel.

\* \* \* \* \*